(12) United States Patent
Scheungraber

(10) Patent No.: US 7,083,692 B2
(45) Date of Patent: Aug. 1, 2006

(54) METHOD AND DEVICE FOR VULCANIZING SHAPED BODIES FROM RUBBER MIXTURES

(75) Inventor: Patrick Scheungraber, Poing (DE)

(73) Assignee: Stahlgruber Otto Gruber GmbH & Co. KG (DE)

( * ) Notice: Subject to any disclaimer, the term of this patent is extended or adjusted under 35 U.S.C. 154(b) by 266 days.

(21) Appl. No.: 10/239,928

(22) PCT Filed: Mar. 29, 2001

(86) PCT No.: PCT/EP01/03616

§ 371 (c)(1),
(2), (4) Date: Sep. 26, 2002

(87) PCT Pub. No.: WO01/72505

PCT Pub. Date: Oct. 4, 2001

(65) Prior Publication Data

US 2003/0054060 A1    Mar. 20, 2003

(30) Foreign Application Priority Data

Mar. 31, 2000  (DE) ................................ 100 16 165

(51) Int. Cl.
*B29C 73/30*  (2006.01)
(52) U.S. Cl. .................... 156/73.6; 156/95; 156/394.1; 264/36.14; 264/71; 264/496; 264/DIG. 74; 425/15; 425/26; 425/383
(58) Field of Classification Search ............ 156/95–97, 156/73.6, 421.6, 394.1; 264/36.14, 496, 264/71, 313, 347, DIG. 51, DIG. 74; 425/14, 425/15, 26, 397, 398, 383, 340, 343, 421, 425/432, 445, 501, 502
See application file for complete search history.

(56) References Cited

U.S. PATENT DOCUMENTS

| 1,162,397 | A | | 11/1915 | Price |
| 2,333,143 | A | * | 11/1943 | Bennett ..................... 264/449 |
| 2,353,492 | A | * | 7/1944 | O'Connor ................... 366/112 |
| 2,370,956 | A | * | 3/1945 | Harkom ...................... 156/382 |
| 2,375,191 | A | * | 5/1945 | Bower ........................ 366/109 |
| 2,421,097 | A | | 5/1947 | Lakso |
| 2,421,099 | A | | 5/1947 | Vogt |
| 2,421,100 | A | | 5/1947 | Lakso |
| 2,421,102 | A | | 5/1947 | Lakso et al. |
| 2,814,830 | A | * | 12/1957 | Leeth .......................... 425/26 |
| 3,072,968 | A | * | 1/1963 | Watson et al. ........... 264/211.2 |
| 4,003,778 | A | * | 1/1977 | Phillips ...................... 156/289 |
| 4,246,226 | A | | 1/1981 | MacMillan |
| 4,755,341 | A | * | 7/1988 | Reavely et al. ............. 264/313 |

FOREIGN PATENT DOCUMENTS

| DE | 32666 | 8/1885 |
| DE | 1 218 145 | 6/1966 |
| DE | 42 04 171 | 8/1993 |

(Continued)

*Primary Examiner*—Geoffrey L. Knable
(74) *Attorney, Agent, or Firm*—The Maxham Firm

(57) ABSTRACT

Methods and devices for vulcanizing or cross-linking under pressure and increased temperature shaped bodies that consist especially of rubber mixtures. The shaped body is first dipped into a bed of fine-grained pourable or free-flowing bulk material with the sections to be vulcanized and the bulk material is brought into evenly tight contact with the surfaces of the shaped body while the bulk material is pressurized and brought to the elevated temperature at least in the region adjoining the section of the shaped body to be vulcanized.

11 Claims, 1 Drawing Sheet

FOREIGN PATENT DOCUMENTS

| | | |
|---|---|---|
| DE | 93 10 452 | 10/1993 |
| DE | 295 19 164 | 3/1996 |

\* cited by examiner

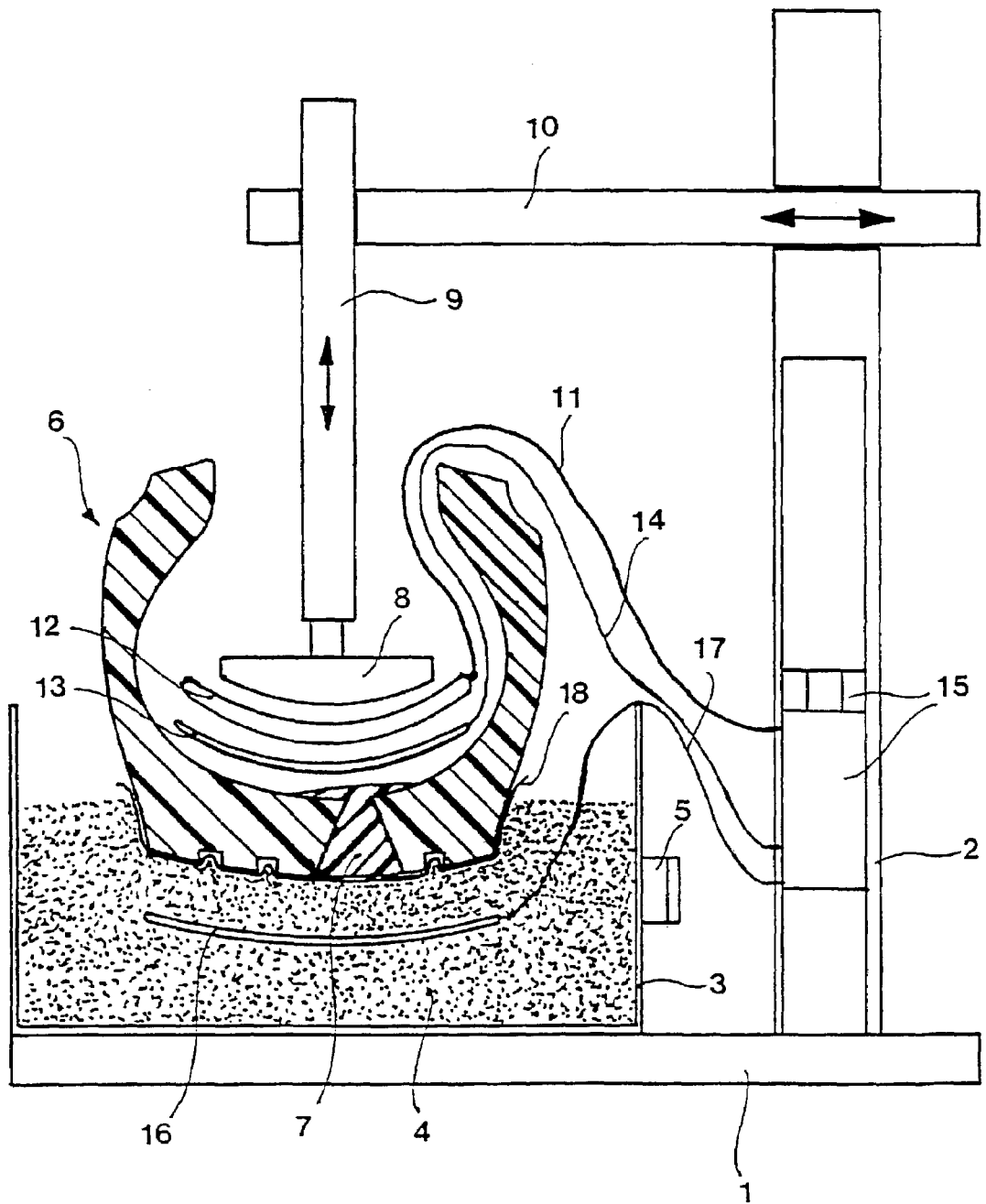

METHOD AND DEVICE FOR VULCANIZING SHAPED BODIES FROM RUBBER MIXTURES

BACKROUND OF THE INVENTION

1. Field of Invention

The invention relates to a method and to a device for vulcanizing or cross-linking under pressure and increased temperature shaped bodies that consist especially of rubber mixtures.

2. Discussion of Related Art

Vulcanizing or cross-linking pre-shaped rubber bodies regularly involves the problem of uniformly distributing the pressure and increased temperature required for vulcanizing over the often complex surface profile of the rubber body. For technical and financial reasons the use of respective exactly matching fixed moulds is only reasonable in the serial production of identical shaped bodies.

In practice vulcanizing methods for repairing air filled tires have been proven in which a pressure head having a crowned outer surface acts on the smooth-walled inner surface of the tires, possibly via a deformable pressure pad and a heating mat, the pressure required for the vulcanizing process being provided by feeding the pressure pad and the vulcanizing temperature being generated by the electric heating mat. The crowned shape of the pressure head and the flexibility of the pressure pad ensure a sufficiently uniform distribution of the vulcanizing pressure and temperature on the damaged section on the inner side of the tire prepared by being filled with rubber parts and possibly being covered with repair plasters.

According to, for example, the DE 93 104 452 U1 the supports for obtaining the counter pressure acting on the outer side of the tire consist of a plurality of individual parts which are adjustable with respect to each other allowing a relatively coarse shape adjustment to the profile of the sometimes complexly shaped damaged section of the tire. Such supports require considerable production expenses and must be adjusted as precisely as possible for each tire in accordance with the position of the damaged section to enable an adequate distribution of the reaction forces as well as the heat generated by a second electric heating mat. Using such multi-part supports therefore involves increased costs for the complete vulcanizing device as well as disadvantageous adjustment works. Furthermore deformations and impressions on the tire are unavoidable with these conventional systems despite an optimum adjustment.

The DE-PS 32 666 C (1885) describes a method and a device for vulcanizing pre-shaped rolled rubber printing plates having a wall thickness of 1 to 2 mm. A print model is inserted into a box referred to as a "cuvette" together with such a thin rubber plate and a paper layer, the cuvette then being closely shut by means of a swivel-mounted cover. The cuvette is then placed in a box the bottom of which is covered with about 2 cm of dry pulverized sand. The container is supported on legs on the bottom of the box, i.e., the sand bed itself does not provide the support for the container. The sand bed surrounds the closed container—not the vulcanized shaped body—so that the bulk material is not in a uniformly tight contact with the surfaces of the shaped body and the vulcanizing pressure is not applied to the shaped body even during the vulcanizing process.

SUMMARY OF THE INVENTION

It is the object of the invention to provide a method and a device for vulcanizing shaped bodies consisting of rubber mixtures, particularly prepared damaged sections of, for example, air filled tires, which enable a uniform and positive distribution of the pressure required for vulcanization or cross-linking as well as a corresponding application of heat with technically simple means at low costs even in case of rubber bodies having a complex shape.

For solving said problem the sections to be vulcanized of the pre-shaped rubber body are dipped into a bed of a fine-grained pour-able bulk material, the bulk material being pressed into a uniformly tight contact to the surface contours of the shaped body, for example, by means of vibrations or by moving the shaped body, the bulk material then being pressurized and heated to the increased temperature at least in the region adjoining the sections of the shaped body to be vulcanized.

The invention makes use of the special features of a bed of bulk material which has a fluid-like consistency while its particles contact the surfaces even of shaped bodies with complicated contours with a uniform density when these are inserted into the bed of bulk material under pressure or initial movement. On the other hand the bed of bulk material behaves like a rigid body under large-area static pressure and can therefore form a quasi-solid support for plane areas of the shaped body. Further the thermal properties of the appropriate bulk material for the vulcanizing process according to the invention are of particular importance for counter-acting a local overheating so that a uniform maintenance and distribution of the vulcanizing temperature is ensured in the section of the shaped body to be repaired.

Above that the bulk material enables an optimized heat conduction into the shaped body to be vulcanized without exposing the peripheral regions to unnecessary heating. In case of a serial production the heat storage capability of the bulk material allows a clear reduction of the vulcanization time which may amount to up to 25% depending on the shaped part.

The device according to the invention for vulcanizing shaped bodies consisting of rubber mixtures, particularly prepared defective sections of air filled tires, comprises a support adjusted to the contour of the shaped body to be vulcanized, a pressure member pressing the shaped body against said support for generating the vulcanizing pressure and at least one heating means for heating the section of the shaped body to be vulcanized, the support according to the invention being a bed of pourable fine-grained heatable bulk material. Suitably the bulk material is a quartz sand of suitable grain size, fine-grained, advantageously spherical metal granules or other mineral solid material mixtures having the fluid-like properties mentioned above in a loose state and high pressure recipiency in a quiescent solid state. In addition, heat-resistant fiber materials, particularly loose mineral fibers, may be used as bed material alone or as a mixture with the fine-grained bulk materials mentioned above. Furthermore the bulk material may contain certain substances, for example sulfur, an accelerator or the like positively influencing the progression of the vulcanizing process in a desired way.

A heating of the bed of bulk material at least in the region adjoining the shaped body may be effected in different ways, for example by using an electric heating mat, electric heating rods embedded in the bulk material in a certain distance to the shaped body, by hot gas introduced into the bulk material or by inductive heating.

To prevent an indention of particles of the bulk material into the softening zones of the shaped body during the vulcanization process suitably a heat-resistant, highly flexible protection and separation foil covering the surface of the raw rubber fill exposed to the hot bed of bulk material may be used.

Finally, an advantageous embodiment of the invention is characterized by the use of at least one vibrator mounted on the wall of the bed container and causing the bulk material to vibrate with a high frequency and thus to reach a quasi free-flowing state. For the same purpose vibrators in the form of hand-held devices can be variably used so as to act on the container wall or on the shaped body to be vulcanized, or they can be dipped into the bulk material. The application of vibrations is only effected during the preparation phase before the actual vulcanization process is carried out.

In particular, the subject matter of the invention is a device for vulcanizing a prepared damaged section of an air filled tire comprising a trough-shaped container partly filled with the bulk material, a vertically shiftable pressure head, a pressure pad and a heating mat disposed between the pressure head and the inner surface of the tire, a heat-resistant foil being in tight contact to the profiled outer surface of the tire as well as a heating means disposed in the bed of bulk material.

The particular advantages of the invention reside in the extraordinarily simple execution of the vulcanization even of rubber bodies having a complicated shape due to the use of the bed of bulk material that can be adjusted even to the most complex shapes, has particularly advantageous properties with respect to thermal conductivity and heat distribution and enables an accurate shape adjustment without expensive measures. In accordance with the concept of the invention for the first time individual studs of large tires can be repaired or restored. This was impossible so far. In case of serial vulcanization the heat storage capacity of the bulk material is another advantage.

BRIEF DESCRIPTION OF THE DRAWING

Other advantages and particularities of the invention will become clear from the following description of a device for vulcanizing prepared defective sections of an air filled tire schematically shown in the drawing.

DETAILED DESCRIPTION OF THE PREFERRED EMBODIMENTS

On a platform 1 possibly provided with guiding rollers a column 2 as well as a trough-shaped container 3 are fixed adjacent to each other. Said container 3 is partially filled with quartz sand 4 and in one position contains at least on vibrator 5 causing the bed of quartz sand to reach a quasi free-flowing, dense state upon electric, mechanic or pneumatic activation.

A tire 6 a defective section 7 of which has been filled with a non-vulcanized rubber mass is dipped into the bed of quartz sand 4.

On the inside of the tire a pressure head 8 is disposed, the lower end of which is mounted on a feedable rod. Said rod 9 passes a through hole in a transverse carrier held in the upper part of the column so as to be adjustable in the direction of the arrow. Further a pressure pad 12 to which a pressure fluid, for example pressurized air, is supplied via a line 11, as well as a heating mat 13 connected to a control unit 15 mounted on the column via an electric line 14 are disposed between the crowned bottom side of the pressure head 8 and the inner surface of the tire 6. A second heating mat 16 is positioned in the bed of quartz sand 4 in an appropriate distance to the surface of the tire and also connected to the control unit 15 via an electric line 17. The outer surface of the section to be repaired may be covered by a highly flexible, heat-resistant protective foil 18 to attain an additional smoothing of the rubber filling to be vulcanized.

For carrying out the vulcanization of the rubber mixture introduced into the defective section as well as for vulcanizing the possibly required repair plaster the section of the air filled tire to be repaired is placed on the bed of bulk material. The pressure head 8 is then lowered into the interior of the tire after the heating mat 13 as well as the pressure pad 12 have been placed in the interior of the tire. With the lowering movement of the pressure head 8 effected with a predetermined force and/or by introducing the pressure fluid into the pressure pad 12 with a defined pressure the rubber body is pressed against the bed of bulk material serving as a support. By activating the vibrator 5 for a defined period of time and thus by applying vibrations to the bulk material a densification and positive contact of the bulk material with the outer contour of the tire are attained. After the defined active time of the vibrator the pressure inside the pressure pad 12 is again increased to apply the pressure required for the vulcanization to the defective section. The bed of quartz sand now serves as a quiescent, dimensionally stable counter support during the vulcanization process. The heating required for the vulcanization is provided by turning on the power supply to the heating mats 14 and 16. The different parameters may be adjusted by means of adjusting switches so that the vulcanization is carried out and terminated after a predetermined time.

The invention is not limited to the illustrated embodiments. Instead of the tire shown other shaped bodies may be partly or fully vulcanized in the bed of bulk material, and hot gasses injected into the bed of bulk material, for example, through porous wall or bottom parts of the container may be used for heating the bed of bulk material at least in the regions adjoining the shaped body. With the illustrated embodiment, it is also possible to fill a suitable bulk material, particularly quartz sand, into the interior of the air-filled tire to a previously selected level, the heating mat 13 then being embedded in the bulk material and its surface being pressurized directly by the pressure head 8—possibly omitting the pressurized air pad 12.

The invention claimed is:

1. A method for vulcanizing or cross-linking a section of a shaped body consisting of rubber mixtures under pressure and increased temperature, the method comprising:

placing a section of the shaped body which includes the section to be vulcanized or cross-linked on an open bed of fine-grained flowable bulk material which serves as a positive support for the shaped body;

reciprocating or vibrating the bed of bulk material or the shaped body, or both, so that the bulk material is brought into a uniformly tight contact with the surfaces of said section of the shaped body including the section to be vulcanized or cross-linked;

thereafter, heating the shaped body or the bulk material, or both, to the increased vulcanization or cross-linking temperature; and pressing only the section of the shaped body including the section to be vulcanized or cross-linked against the positive support of the bulk material until the vulcanization process is completed.

2. The method according to claim 1, wherein the surface of the shaped body is covered with a material chosen from the group consisting of a heat-resistant foil, heat-resistant paint, matching shaped parts of sheet metal, and matching shaped parts of sheet plastic, at least at the section to be vulcanized, previous to the placement of the section on the bed of bulk material.

3. A device for vulcanizing or cross-linking sections of tires consisting of rubber mixtures, the device comprising:
   a pressure-tight support adjusted to the outer contour of a defective section of the tire;
   a pressure head shiftable on a stationary attachment;
   a pressure pad and a heating plate disposed between the pressure head and the inner surface of the tire;
   wherein the support is a heated fine-grained flowable bulk material accommodated in a trough-shaped container the upper side of which is open, the part of the tire containing the defective section being insertable into the bulk material by means of the pressure head.

4. The device according to claim 3, wherein the bulk material is selected from the group consisting of quartz sand and fine-grained spherical metal granules.

5. The device according to claim 3, wherein the bulk material contains substances, for example, sulfur or an accelerator that positively influence the progression of the vulcanization or cross-linking process in a desired way.

6. The device according to claim 4, wherein the bulk material contains substances, for example, sulfur or an accelerator that positively influence the progression of the vulcanization or cross-linking process in a desired way.

7. The device according to claim 3, and further comprising heating elements in the bulk material.

8. The device according to claim 4, and further comprising heating elements in the bulk material.

9. The device according to claim 3, and further comprising at least one vibrator for vibrating the bulk material during placement of the tire, after the tire has been filed with air, in the bulk material.

10. The device according to claim 4, and further comprising at least one vibrator for vibrating the bulk material during placement of the tire, after the tire has been filed with air, in the bulk material.

11. The device according to claim 7, and further comprising at least one vibrator for vibrating the bulk material during placement of the tire, after the tire has been filed with air, in the bulk material.

* * * * *